United States Patent [19]
Fox

[11] 4,285,700
[45] Aug. 25, 1981

[54] FUEL ENRICHMENT APPARATUS AND METHOD FOR GASEOUS FUEL MIXERS

[75] Inventor: Clarence D. Fox, Decatur, Ill.

[73] Assignee: Borg-Warner Corporation, Chicago, Ill.

[21] Appl. No.: 107,689

[22] Filed: Dec. 27, 1979

[51] Int. Cl.³ .............. F02M 21/04; F02M 13/08; F02M 25/00; B01F 3/02
[52] U.S. Cl. .................. 48/180 C; 48/184; 123/463; 123/527; 261/69 A
[58] Field of Search .............. 48/180 R, 180 C, 184; 261/69 A, 50 A; 123/463, 527

[56] References Cited

U.S. PATENT DOCUMENTS

| | | | |
|---|---|---|---|
| 2,073,298 | 3/1937 | Ensign | 48/184 |
| 2,346,763 | 4/1944 | Jones | 48/180 |
| 2,597,335 | 5/1952 | Jones | 48/180 |
| 2,698,226 | 12/1954 | Peduzzi | 48/184 |
| 2,754,185 | 7/1956 | Ensign | 48/184 |
| 2,775,981 | 1/1957 | Zonker | 137/505.12 |
| 2,831,757 | 4/1958 | Miles | 48/184 |
| 2,831,758 | 4/1958 | Warner et al. | 48/184 |
| 2,894,829 | 7/1959 | Harrison | 48/184 |
| 2,983,592 | 5/1961 | Jones | 48/184 |
| 3,081,160 | 3/1963 | Ensign | 48/184 |
| 3,330,545 | 7/1967 | Donovan | 261/69 A |
| 3,545,948 | 12/1970 | Baverstock | 261/50 A |

OTHER PUBLICATIONS

"Duel Fuel Control Module Operation & Rebuilding", Marvel-Schebler/Tillotson, Division of Borg-Warner Corporation.

Primary Examiner—Peter F. Kratz
Attorney, Agent, or Firm—Florian S. Gregorczyk

[57] ABSTRACT

A fuel enrichment apparatus and method is shown for a gaseous fuel carburetor of either a fixed venturi or air valve type. The apparatus provides fuel enriching at the starting and wide open throttle conditions of the carburetor when the pressure drop in the induction passage is at a minimum. The apparatus also economizes on fuel usage by being closed to fuel transfer at idle speed and normal engine speed. The apparatus operates from the fuel supply line to the carburetor with only the fuel pressure available in that line, thereby obviating the need for either a second fuel line or a high pressure fuel line.

8 Claims, 4 Drawing Figures

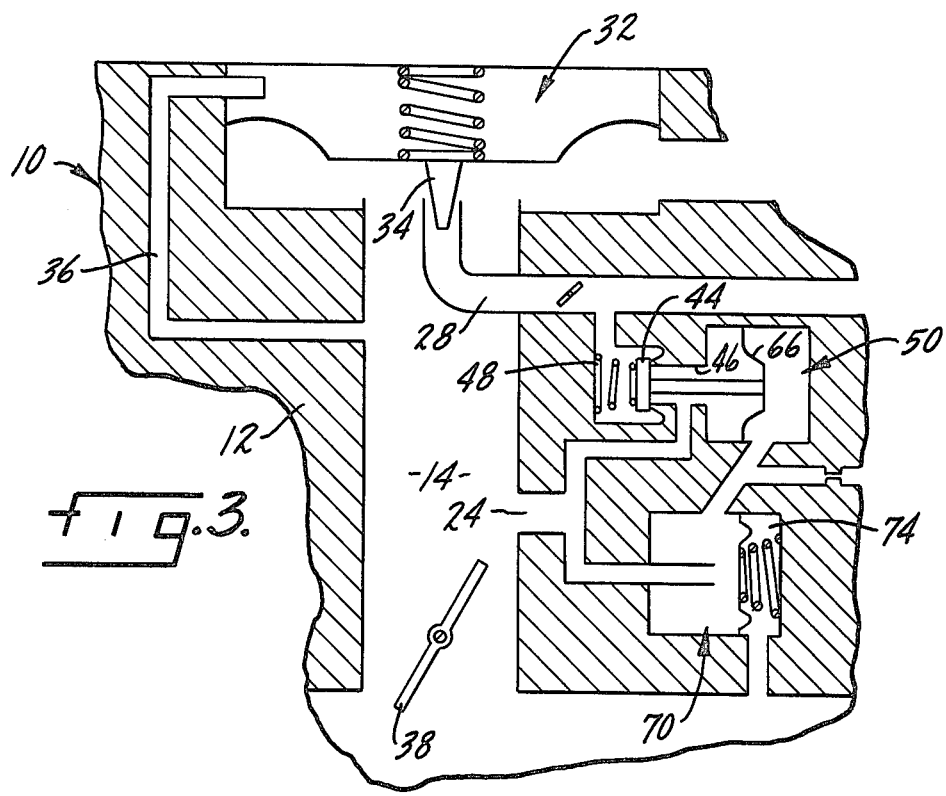
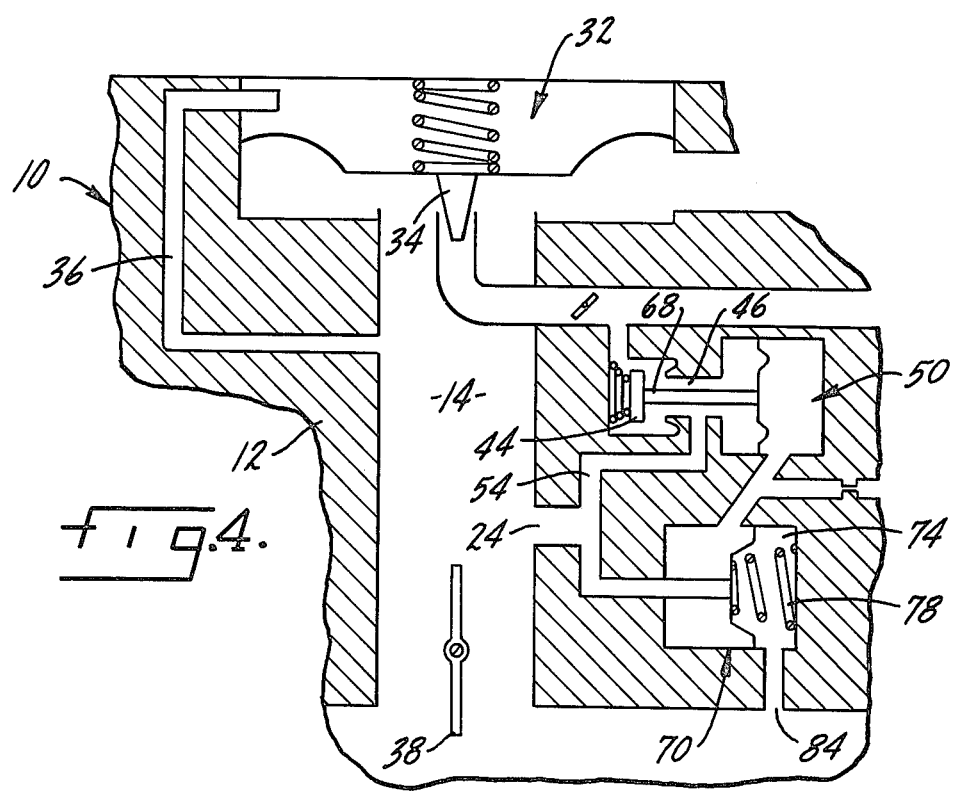

FUEL ENRICHMENT APPARATUS AND METHOD FOR GASEOUS FUEL MIXERS

BACKGROUND OF THE INVENTION

The present invention relates generally to a fuel enrichment apparatus for a fuel mixer or carburetor. More specifically the invention is directed to a gaseous type carburetor utilizing a gaseous fuel combustible in an internal combustion engine. The added distinction of this invention is that it can be applied to either an air valve carburetor or to a carburetor with a fixed venturi. The invention is, therefore, applicable to a dual fuel type carburetor, that is, a carburetor or carburetor tandem that will operate with either liquid or gaseous fuel although the enrichment arrangement functions only during the gaseous operation.

The enrichment aspect of the invention is engageable at the start-up or cranking of an internal combustion engine to aid in starting, and is also available to induce supplemental fuel at wide open throttle or heavy load.

Prior art carburetors had various devices for idle control and for supplemental fuel at wide open throttle. Many supplemental fuel devices are known for liquid fuel carburetors in conjunction with a fixed venturi in the induction passage. Still other devices have shown idle assist devices for liquid petroleum (LP), gas fuel mixers and have included devices utilizing high pressure lines from the primary side of an LP gas evaporator rather than utilizing the low pressure fuel of the secondary side of the LP gas evaporator.

The present structure can be utilized in a fixed venturi type carburetor, but it can also be applied to an air valve type carburetor wherein it is generally considered that this type carburetor has a variable venturi such that the flow rate may be variable but the pressure head is constant in the induction passage above the throttle plate. The invention monitors the low pressure gas of the main fuel supply line. At start-up of an internal combustion engine there is little or no manifold vacuum and, therefore, insufficient low pressure in the induction passage to open the air valve in an air valve carburetor and induct fuel through the induction passage. There is, however a slight pressure depression below atmospheric pressure just above the throttle plate. This pressure depression is about six (6) inches of water column (6" w.c.). At the cranking of an engine additional fuel near the throttle plate is required for starting, and at full throttle added fuel is required to satisfy the added load. At idle or at cruising speed the pressure drop in the induction passage is adequate to actuate opening of an air valve and is sufficient to induce gas past a fuel metering cone into the engine for combustion; therefore, fuel enrichment is not required at idle or cruising speeds. Should the engine revolutions per minute (RPM) decline at wide open throttle due to an overload condition, there would be a change in the manifold vacuum below that necessary to open the air valve to allow adequate fuel for the engine. The fuel enrichment apparatus would respond to such a condition so as to supplement the main fuel supply under the changed vacuum condition.

SUMMARY OF THE INVENTION

The present invention relates to a fuel enrichment apparatus for a gaseous fuel carburetor. The invention supplies supplemental fuel at the start-up or wide open throttle conditions, low vacuum or heavy load, for such carburetor when applied to an internal combustion engine. The invention is particularly applicable to an air valve type carburetor wherein the main fuel supply is dependent upon the manifold vacuum to induce or pull fuel and air through the induction and mixing passage. The invention circumvents the main fuel supply for initial starting, without continuous fuel flow through the invention during idle and cruising ranges. In addition, at wide open throttle or heavy load the fuel enrichment structure of the invention again supplies fuel to the induction passage. Further, this supplemental fuel supplied by the invention does not require an added fuel line but rather it extracts the fuel from the main fuel line, generally from the secondary side of an evaporator at a low pressure. This last feature obviates any necessity of utilizing a high pressure fuel line, where such high pressure fuel is derived from either the primary section of a fuel evaporator or through the use of an added fuel pump.

In a preferred embodiment the invention includes an atmospheric vent with two diaphragm valves in parallel. The supplemental fuel bypasses the main fuel metering cone and is transferred to the induction passage upstream of the throttle plate. The supplemental fuel valve is opened at start-up by a diaphragm valve acting in response to a small pressure drop near the throttle plate, as atmospheric pressure flexes the diaphragm of an expansion chamber motor to open the fuel valve. After engine start-up there is an increase in manifold vacuum below the throttle plate and the second diaphragm valve opens to allow atmospheric air to enter the supplemental fuel passage. This balances the pressure to atmospheric on both sides of the first or supplemental fuel line diaphragm, allowing this valve to close at what is referred to as engine idle speed. At wide open throttle the manifold vacuum is the same as the pressure in the induction passage, which pressure actuates the supplemental fuel line diaphragm, and this depression from atmospheric pressure again opens the supplemental fuel line, allowing supplemental fuel to enter the induction passage.

BRIEF DESCRIPTION OF THE DRAWINGS

In the several figures of the drawings, like reference numerals identify like components, and in those drawings:

FIG. 3 is a diagrammatic sectional view of the carburetor fuel enrichment apparatus arrangement with the engine at idle or cruise speed; and FIG. 4 illustrates a diagrammatic sectional view of the apparatus with wide open throttle.

DETAILED DESCRIPTION OF THE INVENTION

Figure 1:
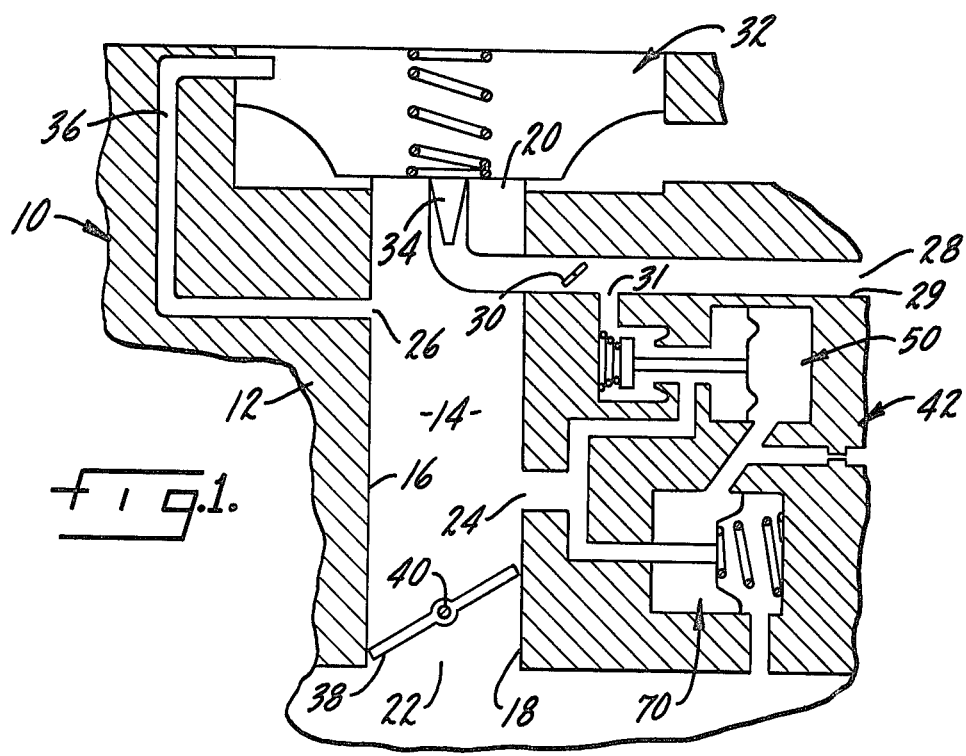
FIG. 1 is a diagrammatic sectional side view of the fuel enrichment apparatus of the present invention attached to an air valve gaseous fuel carburetor induction passage, shown in the start-up or cranking position.

In FIG. 1 an air valve gaseous fuel carburetor 10 has six main components. The first main component is a central body portion 12 defining an air induction and mixing passage 14 with side walls 16 and 18, an entry end 20, and a discharge end 22. Side wall 18 of air induction and mixing passage 14 defines an auxiliary fuel port 24 and side wall 16 defines a monitoring port 26. The second major component is a main fuel supply passage 28 with a sidewall 29, a deflector 30 permanently affixed in fuel supply passage 28 and a fuel port 31 defined by sidewall 29. The third major component is a spring-biased, normally-closed diaphragm valve 32 is mounted atop induction passage 14 with the fourth component, a fuel metering cone 34, mounted below the diaphragm valve 32 in the induction passage 14 and terminating in the end of main fuel supply passage 28. This diaphram valve 32 is responsive to the pressure depression in the induction passage 14 which depression is monitored through port 26 and a passage 36 communicating with diaphragm valve 32. Mounted in the induction passage 14 is a movable throttle member 38, the fifth major component, pivotally mounted to rotate about a shaft 40 which is centrally located. The throttle plate 38 is responsive to an external signal or force through any communication or linkage means (not shown) known in the art. As this throttle 38 is opened it reflects a general increase in the fuel demand by the engine (not shown) to which the carburetor of this preferred embodiment is attached.

Figure 2:
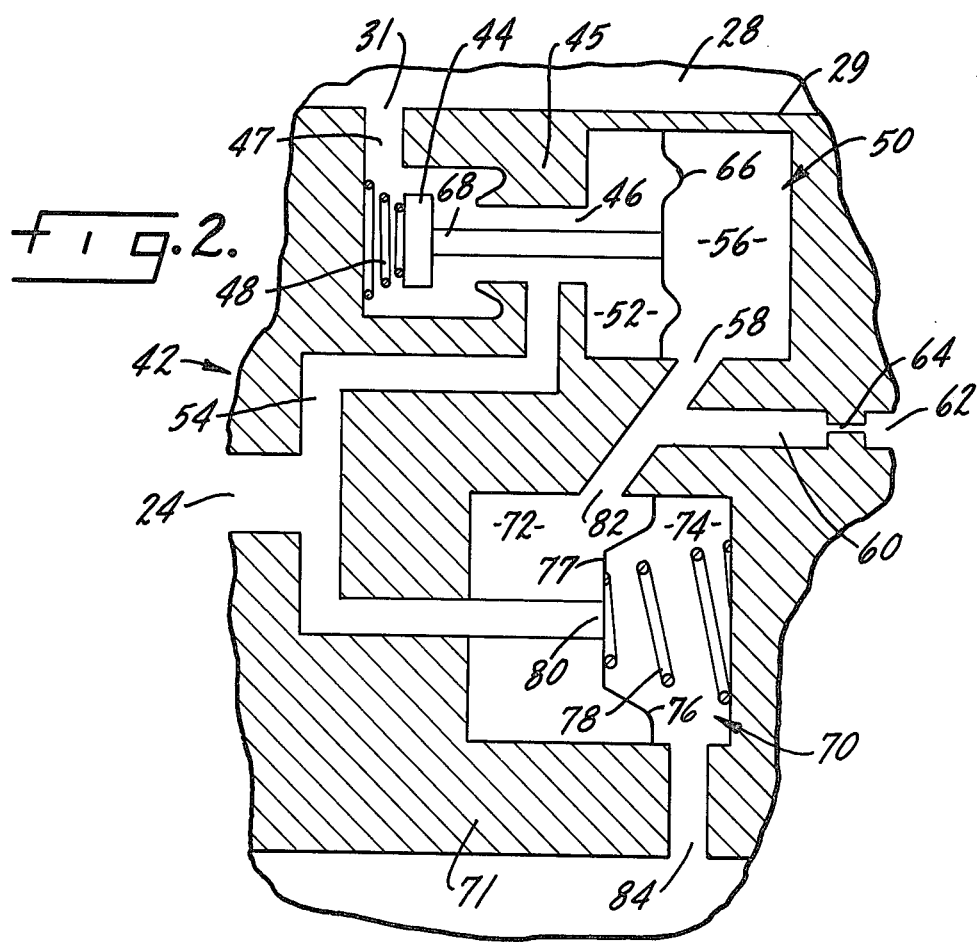
FIG. 2 is a diagrammatic sectional view of the carburetor fuel enrichment apparatus of FIG. 1 on an enlarged scale.

Attached by any conventional means (not shown) to the carburetor 10 is a subassembly fuel enrichment apparatus 42, the sixth major component, illustrated in FIG. 1 and in an enlarged view in FIG. 2. This subassembly includes an auxiliary fuel valve assembly 44, with an auxiliary fuel valve body 45, an aperture 46 and an auxiliary fuel inlet passage 47 both defined by valve body 45, a biasing means 48 acting only to maintain valve 44 to a normally closed position over aperture 46. Said bias means 48 generally has a force responsive to an induction line pressure drop at cranking of about 2 to 5 inches of water column, nominally 4 inches of water column. An expansion chamber motor 50 with a chamber 52 communicates with aperture 46 and thereby communicates with induction passage 14 through a connecting passage 54 between aperture 46 and auxiliary fuel exit port 24. An aperture 46 communicates with main fuel supply passage 28 through auxiliary fuel inlet passage 47 when valve 44 is open. A second chamber 56 of expansion chamber motor 50 is vented to the atmosphere through a port 58 defined by valve body 45 and a passage 60 connecting to an atmospheric vent line 62 wherein is located a restriction 64. The expansion chamber motor 50 has a flexible diaphragm 66 secured between chambers 52 and 56 and with a valve operator 68 connected to said diaphragm 66 to engage normally closed valve 44 in response to a slight pressure depression in chamber 52 of expansion motor 50. Such a depression would therefore allow fuel to flow from main fuel supply line 28 past valve 44 to auxiliary fuel port 24 in response to a slight pressure drop below atmospheric in induction passage 14 as is experienced in a gaseous fuel carburetor at start-up or cranking but before an adquate vacuum is available in induction passage 14 to open diaphragm valve 32 and fuel metering cone 34 to induct fuel to the combustion chamber. This diaphragm valve 32 and fuel metering cone 34 arrangement has therefore been successfully bypassed and ease of start up has been accomplished.

A second normally closed control valve assembly 70 of subassembly 42 with a body 71 is provided with a first chamber 72 and a second chamber 74 with a flexible diaphragm 76 and normally closed control valve 77 biased by bias means 78 to close a port 80 defined by the valve body 71. Means 78 is of such a strength as to generally maintain the valve 77 in closed position against a vacuum up to about 6 inches of mercury, although this bias means force could be set to any desired level. First chamber 72 of control valve assembly 70 is communicated with atmospheric vent line 62 through a passage 82. Second chamber 74 is in communication with the volume below throttle plate 38 by passage 84. Port 80 is in communication with exit fuel port 24 through a passage 54. When the internal combustion engine connected with the carburetor 10 is shut down, control valve 77 is normally biased to close port 80 by bias means 78. The control valve 77 is closed at start up or wide open throttle as the manifold pressure depression below throttle plate 38 is inadequate to reduce the pressure in chamber 74 to allow atmospheric pressure communicated to chamber 72 to overcome biasing means 78. At idle speed and at a cruising or engine speed less than wide open throttle, as shown in FIG. 3, the manifold pressure depression communicated to chamber 74 below the throttle plate 38 is adequate to open control valve 77 and allows equivalent pressure to communicate to fuel exit port 24 and aperture 46 thereby balancing the pressure on both sides of flexible diaphragm 66 of expansion chamber motor 50 and closing valve 44 in response to bias means 48. In addition, air valve 32 is open or retracted in response to the reduced atmospheric pressure above throttle plate 38 communicated by passage 36, and therefore, fuel metering cone 34 is withdrawn from fuel line 28 to allow fuel to be inducted to induction passage 14.

At wide open throttle as illustrated in FIG. 4 control valve 77 is again closed and auxiliary fuel valve 44 is again open to allow fuel to bypass fuel metering cone 34 and be introduced through passage 47, aperture 46, passage 54 and fuel exit port 24. Valve 44 is opened by valve operator 68 of expansion chamber motor 50 moving to the left in this illustration under the slightly reduced pressure of the induction passage 14 above throttle 38, but this slight pressure is the same or about the same as the pressure being monitored by passage 84 to chamber 74 of valve 77 which reduced pressure is inadequate to overcome the spring biasing force of bias means 78. Valve 77 is again closed under these circumstances, and atmospheric pressure is present in chamber 50, and reduced pressure from atmospheric is in chamber 52 to again open valve 44.

The subassembly 42 is shown as an integral part of the illustrated carburetor 10 but it is not necessary to the operation as it could be an independent assembly connected at the ports shown in the drawing. There is no separate or pressurized fuel supply source required for the invention except the low pressure main fuel supply line 28 which is connected to the subassembly 42 by a passage to said main fuel passage 28. Supplemental fuel is not continuously supplied to the carburetor induction passage 14 except at start-up or cranking and at wide open throttle. The action of the fuel enrichment apparatus is based upon engine demand not on an external signal. That is, the fuel is supplied only when needed in response to the engine manifold vacuum measured at approximately the line of the throttle plate 38. It can be readily seen by one skilled in the art that the fuel enrichment apparatus could be utilized with a fixed venturi gaseous carburetor although its distinctive characteristics are more applicable to the operation of an air valve type carburetor. This fuel enrichment device was illustrated as mounted to the side of a op mounted air valve diaphragm carburetor but it is as applicable to a gaseous fuel mixer of the type illustrated in U.S. Pat. No. 4,063,905.

I claim:

1. A fuel enrichment apparatus in combination with a gaseous fuel carburetor having a body defining an air induction and mixing passage and including a main fuel supply passage communicable with said air induction and mixing passage, a movable fuel metering cone arranged and disposed with respect to said main fuel supply passage for metering fuel flow therethrough in response to pressure changes in said air induction and mixing passage, said air induction and mixing passage including a movable throttle member therein, and a vacuum control port downstream of said throttle, wherein said fuel enrichment apparatus includes: means defining an auxiliary fuel inlet passage communicating with said main fuel supply passage, means defining an auxiliary fuel port opening into said air induction and mixing passage upstream of said throttle member, means defining an auxiliary fuel exit passage communcating with said auxiliary fuel port, a normally closed auxiliary fuel valve assembly connected between said auxiliary fuel inlet passage and said auxiliary fuel exit passage, including a pressure responsive valve operator engaging an expansion chamber motor having two chambers, one of said chambers communicating with said auxiliary fuel exit passage and arranged for opening said auxiliary fuel valve assembly in response to a predetermined subatmospheric pressure in said auxiliary fuel exit passage, and a restricted vent passage, in communication with the other of said chambers, and a normally closed control valve connected between said auxiliary fuel exit passage and said restricted vent passage, said control valve having an interior space and a diaphragm dividing said space into first and second chambers, wherein one of the chambers is in communication with said vacuum control port to effect movement of the diaphragm in response to a selected vacuum condition downstream of said throttle member so that the other of said chambers provides communication between the auxiliary fuel exit passage and the restricted vent passage.

2. The combination as claimed in claim 1, and further comprising a diaphragm valve communicating with said air induction and mixing passage and subject to movement under changes in pressure in said passage, with said movable fuel metering cone being affixed to said diaphragm valve.

3. The combination as claimed in claim 1 wherein the normally-closed auxiliary fuel valve assembly is closed by a spring.

4. The combination as claimed in claim 3, wherein the spring has a closing force between 2 and 5 inches of water column pressure.

5. The combination as claimed in claim 1, and further comprising bias means for providing a force to maintain the normally closed control valve in a closed position.

6. The combination as claimed in claim 5 wherein said bias means is a spring.

7. The combination as claimed in claim 5 wherein the bias means is a spring with a spring force of about 6 inches of mercury pressure.

8. The method of enriching the air-fuel mixture in a gaseous fuel carburetor with added fuel by passing the added fuel through an auxiliary fuel inlet passage and an auxiliary fuel port, where the carburetor has a body defining an air induction and mixing passage and including a main fuel supply passage communicable with said air induction passage, and a movable axial metering cone arranged and disposed with respect to said fuel supply passage for metering fuel flow therethrough in response to pressure changes in said induction passage, said air induction passage including a movable throttle member therein and a vacuum control port downstream of said throttle, said enriching method including:

(a) communicating said auxiliary fuel inlet passage with the main fuel supply passage;

(b) communicating an auxiliary fuel exit passage with said auxiliary fuel port opening into the air induction and mixing passage upstream of the throttle member;

(c) connecting a normally closed auxiliary fuel valve assembly between the auxiliary fuel inlet passage and the auxiliary fuel exit passage;

(d) engaging a pressure responsive valve operator with the auxiliary fuel valve assembly, which valve operator includes an expansion chamber motor having two chambers, one chamber communicating with the auxiliary fuel exit passage arranged for opening said auxiliary fuel valve assembly in response to a predetermined subatmospheric pressure in said auxiliary fuel exit passage, and the other chamber communicating with atmosphere through a restricted vent passage; and (e) positioning a normally closed control valve between the auxiliary fuel exit passage and the restricted vent passage, which control valve has an interior space and a diaphragm dividing said space into first and second chambers, wherein the first chamber is in communication with said vacuum control port to effect movement of the diaphragm in response to a selected vacuum condition downstream of the throttle member so that the second chamber provides communication between the auxiliary fuel exit passage and the restricted vent passage.

* * * * *